United States Patent [19]
Daoud

[11] Patent Number: 6,093,891
[45] Date of Patent: Jul. 25, 2000

[54] TELECOMMUNICATIONS EQUIPMENT ENCLOSURES HAVING SIDE SWIVEL STUBS

[75] Inventor: Bassel H. Daoud, Parsippany, N.J.

[73] Assignee: Lucent Technologies Inc., Murray Hill, N.J.

[21] Appl. No.: 09/110,751

[22] Filed: Jul. 3, 1998

[51] Int. Cl.[7] .................................................. H02G 3/18
[52] U.S. Cl. ..................... 174/65 R; 174/65 G; 174/135; 174/153 R; 248/56; 16/2.1
[58] Field of Search ................................ 174/65 R, 65 G, 174/135, 151, 152 G, 153 G, 153 R; 248/56; 16/2.1, 2.2; 439/718; 220/334, 3.8

[56] References Cited

U.S. PATENT DOCUMENTS 2,896,889  7/1959  Hershberger et al. ..................... 248/71

*Primary Examiner*—Kristine Kincaid
*Assistant Examiner*—Dhiru R. Patel
*Attorney, Agent, or Firm*—Steve Mendelsohn

[57] ABSTRACT

An enclosure for telecommunications equipment has one or more swivel stubs extending from the sides of the enclosures. When enclosures are mounted stacked end to end on a wall, access to a swivel stub is not prevented by other enclosures, thereby allowing an enclosure to be added or replaced without having to remove any other enclosures. In one embodiment, the configuration of the enclosures does not limit the number of enclosures that can be stacked end to end. The present invention removes the need for a special mounting bracket to provide clearance for the swivel stubs between the back of the enclosure and the mounting surface.

13 Claims, 4 Drawing Sheets

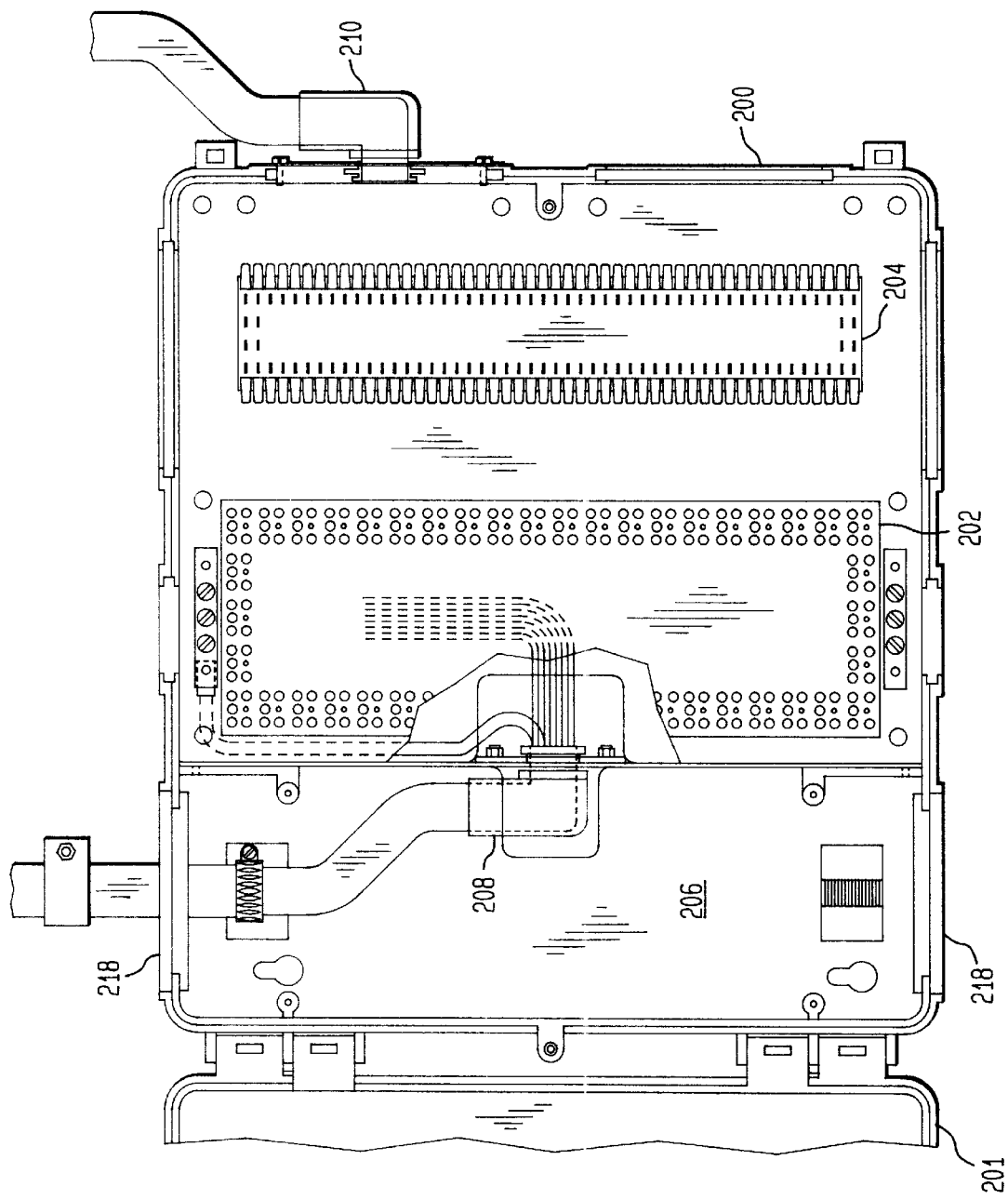

TELECOMMUNICATIONS EQUIPMENT ENCLOSURES HAVING SIDE SWIVEL STUBS

BACKGROUND OF THE INVENTION

1. Field of the Invention

The present invention relates to telecommunications equipment, and, in particular, to enclosures for housing and protecting telecommunications equipment.

2. Description of the Related Art

A building entrance protector (BEP) is an enclosure used to house and protect telecommunications equipment. For example, a BEP may house the components used to interface between a multi-wire cable providing telephone service to a building and the twisted pairs of copper wire for individual telephones distributed throughout the building. These interface components may include connectors, such as insulation displacement connectors (IDCs), as well as electrical isolation components, such as high-voltage/high-current plug-in protectors. The BEP may have two or more hinged pieces that define one or more different compartments within the BEP for such functions as breaking out wires from the multi-wire cable, splicing two cables together, connecting cable wires to electrical isolation components, connecting the electrical isolation components to IDC connectors, and terminating the twisted pairs at the IDC connectors.

FIGS. 1A and 1B show front and cross-sectional end views, respectively, of the base 100 of a conventional building entrance protector. Mounted on base 100 is an electrical isolation interface 102 for receiving high-voltage/high-current plug-in protectors and an IDC block 104 used to terminate copper wires. The BEP may also have a lid (not shown) pivotally connected to base 100 to prevent access to the interface components mounted on base 100. Base 100 is itself mounted to a surface (e.g., a wall) using a special cable-routing bracket 106 that provides clearance between the back of base 100 and the mounting surface for multi-wire cables or bundles of wires passing through two swivel stubs 108 and 110 that are mounted on the back of base 100. As shown in FIG. 1B, wires passing through swivel stub 108 are wrapped around conductors of electrical isolation interface 102. Electrical isolation interface 102 has other conductors that are wrapped with wires that are also wrapped around conductors of IDC block 104. IDC block 104 in turn has other conductors that are wrapped with wires passing through swivel stub 110.

When base 100 is mounted on a surface such as a wall, each swivel stub is rotated to direct its cable of wires in either the up or down direction along the channel formed between cable-routing bracket 106 and the wall. When two or more bases, like base 100, are mounted on a wall stacked end to end, the cable from a swivel stub in one base may pass through the cable channel of one or more other bases. A cable-routing bracket 106 of a particular size will be able to accommodate a fixed number of cables, where that fixed number depends on the sizes (e.g., diameters) of the cables. As such, for a given bracket design, there is also a corresponding fixed number of bases that can be stacked end to end.

Moreover, when bases are stacked end to end, adding an additional base or replacing an existing base may be difficult, requiring the feeding of cables for the new base through the channels of existing bases which may already have a number of other cables running through them. This can be particularly troublesome when a base in the interior of a stack is to be replaced.

Once a base is installed the sides of cable-routing bracket 106 prevent swivel stubs 108 and 110 from easily rotating a full 180 degrees after they are configured with cables. As such, the orientation of the swivel-stub cables of every stacked BEP must be carefully pre-planned. If a cable gets mis-oriented or if the orientation needs to be changed, it can become very difficult to make the necessary changes to the cable orientation, possibly requiring the removal and reinstallation of all of the BEPs in the stack.

SUMMARY OF THE INVENTION

The present invention is directed to a new layout for building entrance protectors that avoids limitations of the prior art. In one embodiment, the present invention is an enclosure for telecommunications equipment, comprising a base and a least one swivel stub connected to a side of the base, such that, when the enclosure is mounted on a mounting surface, the enclosure does not require clearance for the swivel stub between the base and the mounting surface. The present invention (1) allows cable orientation to be easily changed, (2) allows relatively easy replacement of enclosures, even those located in the interior of a stack, and (3) does not limit the number of enclosures that can be stacked end to end.

BRIEF DESCRIPTION OF THE DRAWINGS

Other aspects, features, and advantages of the present invention will become more fully apparent from the following detailed description, the appended claims, and the accompanying drawings in which:

FIGS. 2A–C show front, cross-sectional end, and side views, respectively, of a building entrance protector, according to one embodiment of the present invention.

DETAILED DESCRIPTION

Figure 2C:
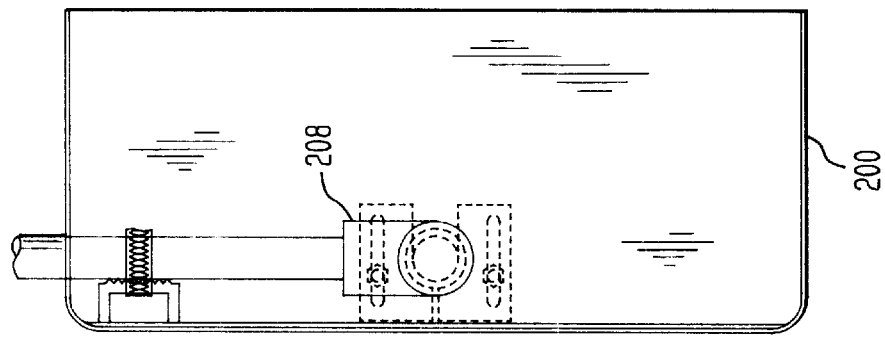
Figure 2B:
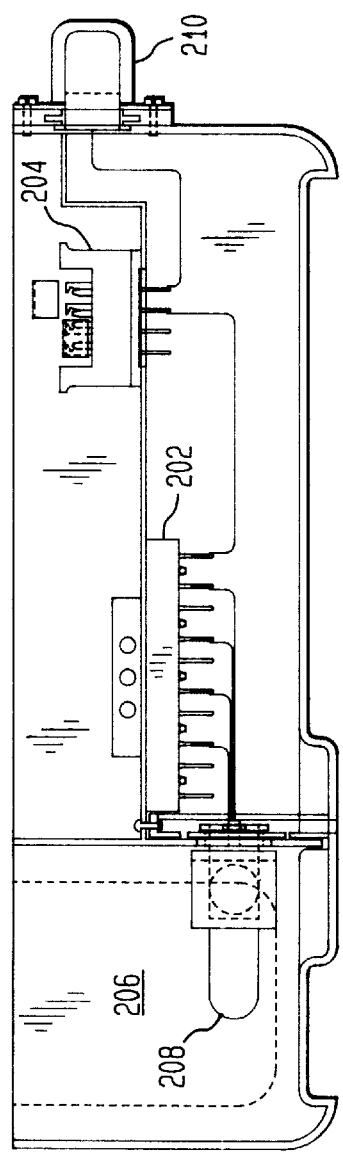

FIGS. 2A–C show front, cross-sectional end, and side views, respectively, of a building entrance protector, according to one embodiment of the present invention. The BEP has a base 200 and a lid 201 (partially shown) pivotally connected to base 200. Mounted on each base 200 is an electrical isolation interface 202 for receiving plug-in protectors and an IDC block 204 used to terminate copper wires. In this particular implementation, each base 200 has a cable chamber 206, although other implementations need not have interior cable chambers.

Figure 1A:
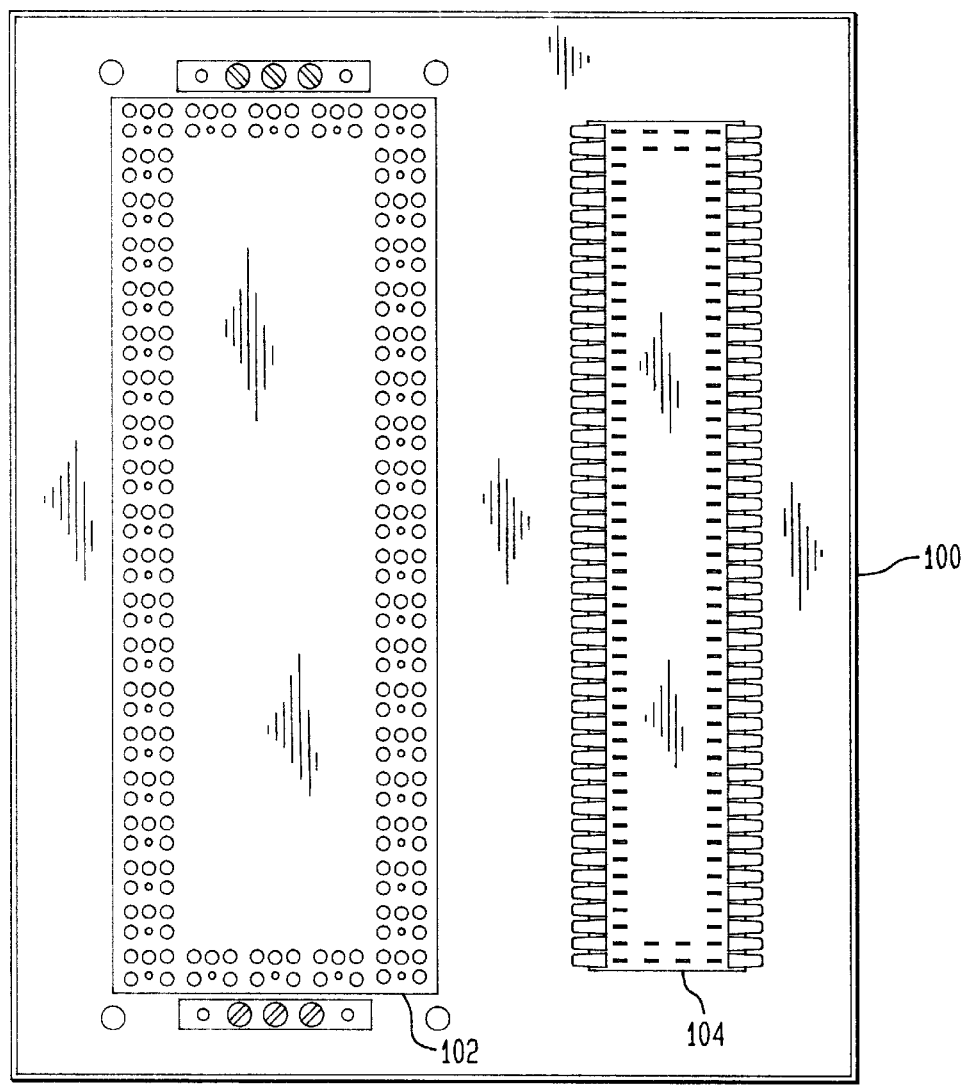
FIGS. 1A and 1B show front and cross-sectional end views, respectively, of the base of a conventional building entrance protector.
Figure 1B:
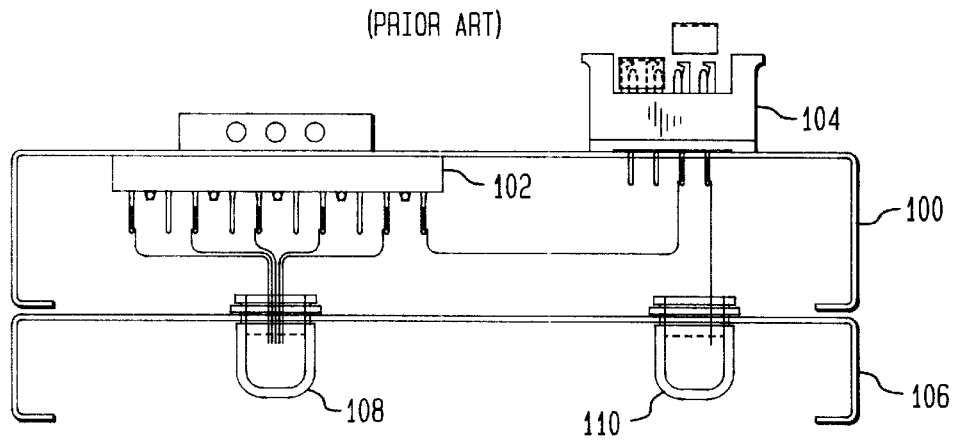

Each base 200 has two swivel stubs—a first swivel stub 208 mounted to one side of the base within the cable chamber 206 and a second swivel stub 210 mounted on the other side of the base. Since the swivel stubs are mounted on the sides of the base, rather than on the back of the base as was the case of prior-art base 100 of FIG. 1, no cable channel is needed behind the base and, as a result, base 200 can be mounted directly to a surface without need of a special cable-routing bracket.

Figure 3:
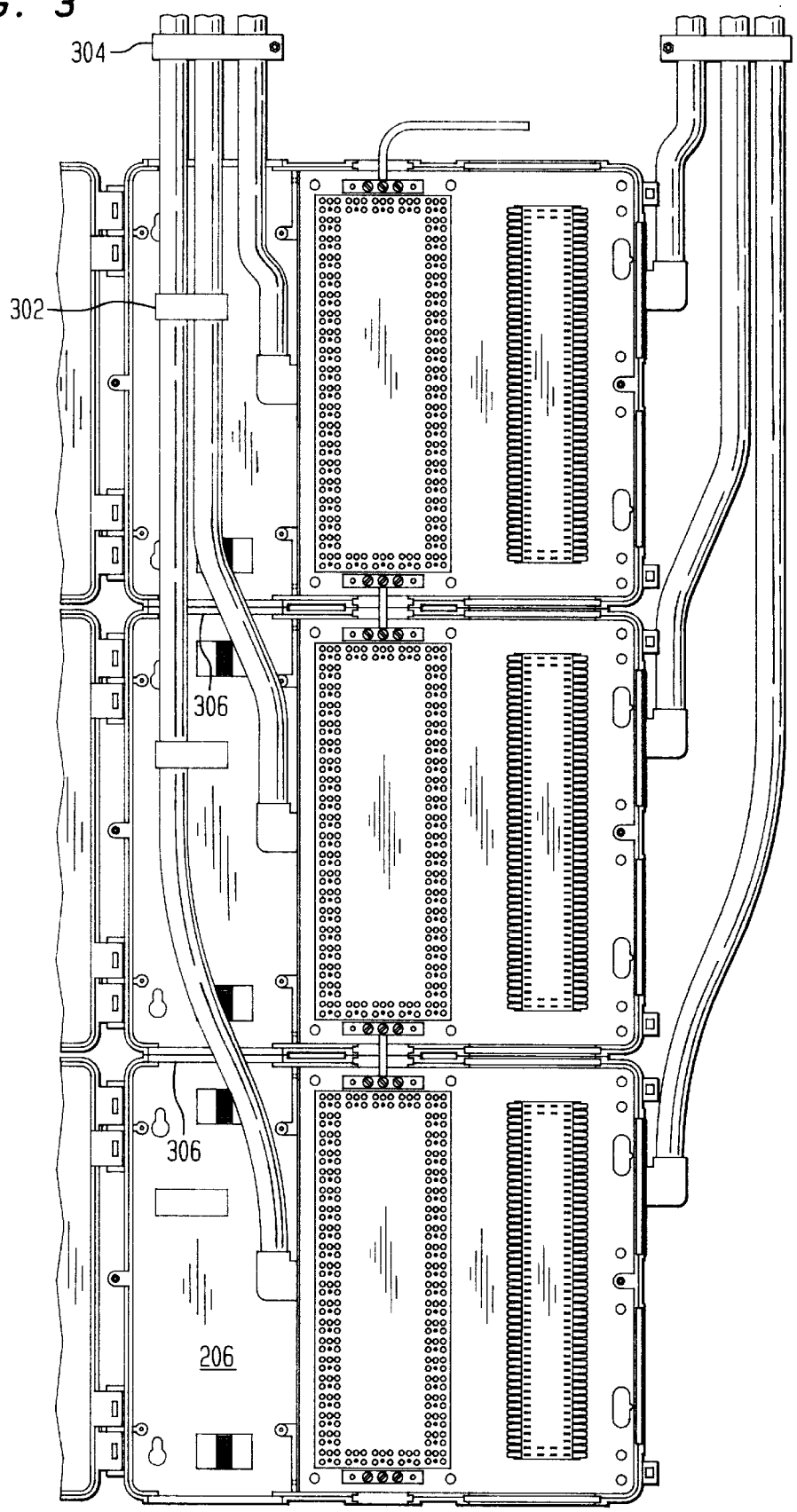
FIG. 3 shows the bases of three building entrance protectors, according to one embodiment of the present invention, mounted on a wall stacked end to end.

FIG. 3 shows three BEPs, similar to the BEP of FIGS. 2A–C, mounted on a wall stacked end to end. As shown in FIG. 3, the cables associated with the various swivel stubs of the different bases run along the stack of BEPs with two or more cables bundled together with retainers such as Velcro tie-down straps 302 located within the BEP cable chambers or removable clamps 304 mounted on the wall external to the BEPs. In either case, the configuration of the present invention enables easy installation of additional BEPs to the stack or replacement of existing BEPs with minimal effort. Moreover, any one or more swivel stubs can be rotated from up to down or from down to up after installation, if the orientation needs to be changed for some reason.

As shown in FIG. 3, the cable chambers 206 have apertures 306 that allow cables to pass from BEP to BEP along the stack. Although the existence of such cable chambers with apertures of finite maximum dimensions may limit the number of BEPs that can be mounted in a stack, in other implementations in which there are no cable chambers on either side of the base, the number of BEPs in a stack would not be limited by the BEP design.

Although the present invention has been described in the context of a building entrance protector having a base and a lid that define a single level of interior chambers, those skilled in the art will understand that the BEP may have intermediate levels that may define, with the lid and the base, two or more different levels of interior chambers.

Similarly, although the invention has been described in the context of building entrance protectors, those skilled in the art will understand that the present invention can be applied to other types of enclosures for telecommunications equipment in which wires are fed through swivel stubs mounted on the enclosure.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An enclosure for telecommunications equipment, comprising a base and at least one swivel stub connected to one of opposite sides of the base, such that, when the enclosure is mounted on a mounting surface, the enclosure does not require clearance for the at least one swivel stub between the base and the mounting surface.

2. The invention of claim 1, wherein the enclosure does not require a mounting bracket to provide clearance for the at least one swivel stub.

3. The invention of claim 1, wherein location of the at least one swivel stub on the base does not limit number of similar enclosures that can be mounted on the mounting surface stacked end to end.

4. The invention of claim 3, wherein two or more cables from two or more enclosures are bundled together by retainers.

5. The invention of claim 3, wherein each stacked enclosure can be removed from a stack without having to remove any other enclosure from the stack.

6. The invention of claim 3, wherein an additional enclosure can be added to a stack without having to remove any other enclosure from the stack.

7. The invention of claim 1, wherein the enclosure comprises two swivel stubs connected to opposite sides of the base.

8. The invention of claim 7, wherein one of the swivel stubs resides in a cable chamber of the base, the cable chamber having one or more apertures to enable one or more cables to pass therethrough.

9. The invention of claim 1, wherein the at least one swivel stub can be rotated about 180 degrees after the enclosure is mounted on the mounting surface.

10. The invention of claim 1, wherein:
   the enclosure comprises two swivel stubs connected to opposite sides of the base;
   the enclosure does not require a mounting bracket to provide clearance for the swivel stubs;
   the location of each swivel stub on the base does not limit the number of similar enclosures that can be mounted on the mounting surface stacked end to end; two or more cables from two or more enclosures are bundled together by retainers;
   each stacked enclosure can be removed from a stack without having to remove any other enclosure from the stack;
   an additional enclosure can be added to the stack without having to remove any other enclosure from the stack; and
   each swivel stub can be rotated about 180 degrees after the enclosure is mounted on the mounting surface.

11. An enclosure for telecommunications equipment, comprising a base and at least two swivel stubs connected to opposite sides of the base, such that, when the enclosure is mounted on a mounting surface, the enclosure does not require clearance for the at least two swivel stubs between the base and the mounting surface.

12. The invention of claim 11, wherein one of the swivel stubs resides in a cable chamber of the base, the cable chamber having one or more apertures to enable one or more cables to pass therethrough.

13. An enclosure for telecommunications equipment, comprising a base and at least one swivel stub connected to a side of the base, such that, when the enclosure is mounted on a mounting surface, the enclosure does not require clearance for the at least one swivel stub between the base and the mounting surface, wherein the at least one swivel stub can be rotated about 180 degrees after the enclosure is mounted on the mounting surface.

* * * * *